(12) United States Patent
Tyler

(10) Patent No.: US 12,416,352 B2
(45) Date of Patent: Sep. 16, 2025

(54) LOW PROFILE ROTARY DAMPER

(71) Applicant: Illinois Tool Works Inc., Glenview, IL (US)

(72) Inventor: Michael Adrian Tyler, Mokena, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/610,578

(22) Filed: Mar. 20, 2024

(65) Prior Publication Data
US 2024/0392869 A1 Nov. 28, 2024

Related U.S. Application Data

(60) Provisional application No. 63/468,160, filed on May 22, 2023.

(51) Int. Cl.
*F16H 57/00* (2012.01)
*F16F 15/16* (2006.01)

(52) U.S. Cl.
CPC ....... *F16H 57/0006* (2013.01); *F16F 15/165* (2013.01)

(58) Field of Classification Search
CPC ..... F16H 57/0006; F16F 15/165; F16F 15/16; F16F 9/12; F16F 9/145; F16F 9/10; E05F 3/14
See application file for complete search history.

(56) References Cited

U.S. PATENT DOCUMENTS 5,269,397 A * 12/1993 Kawamoto ............. B29C 66/55
                                                                 192/58.4
6,298,960 B1 * 10/2001 Derr .................. B29C 66/30223
                                                                 188/290

(Continued)

FOREIGN PATENT DOCUMENTS

CN        110094446 A  *  8/2019  ............ F16F 9/3207
EP         1650468 A1  *  4/2006  ............ B29C 65/08

(Continued)

OTHER PUBLICATIONS

ITW Motion Webpage—Large Rotary Dampers (Webpage Accessed Mar. 20, 2024).

*Primary Examiner* — Thomas C Diaz
(74) *Attorney, Agent, or Firm* — McAndrews, Held & Malloy, Ltd.

(57) ABSTRACT

Described is a low profile rotary damper assembly having a rotor, an annular seal, a housing, a bearing plate, and a gear. The rotor includes a shaft portion integrally formed with a body portion. The shaft portion defines an engagement interface at a distal end thereof. The annular seal is configured to surround at least a portion of the shaft portion. The housing defines an opening and a rotor cavity, wherein the housing is configured to rotatably support the rotor. The bearing plate is coupled to the housing and is configured to seal the opening. The bearing plate includes an annular shoulder defining an aperture and a convex cap defining a seal cavity for the annular seal between the body portion and an interior surface of the convex cap. The shaft portion extends axially outwardly through the aperture. The gear is coupled to the rotor via an opening that is configured to receive the engagement interface. The gear is shaped with a generally concave cavity that is sized and shaped to receive the collar and at least a portion of the convex cap.

20 Claims, 7 Drawing Sheets

(56) References Cited

U.S. PATENT DOCUMENTS

| | | | |
|---|---|---|---|
| 6,840,356 B2 * | 1/2005 | Nishiyama | F16F 9/346 16/51 |
| 6,968,929 B2 * | 11/2005 | Doornbos | F16F 9/12 188/290 |
| 2004/0155392 A1 * | 8/2004 | Doornbos | F16F 9/12 267/290 |

FOREIGN PATENT DOCUMENTS

| | | | |
|---|---|---|---|
| JP | 2527038 Y2 * | 2/1997 | |
| KR | 200242488 Y1 * | 10/2001 | |

\* cited by examiner

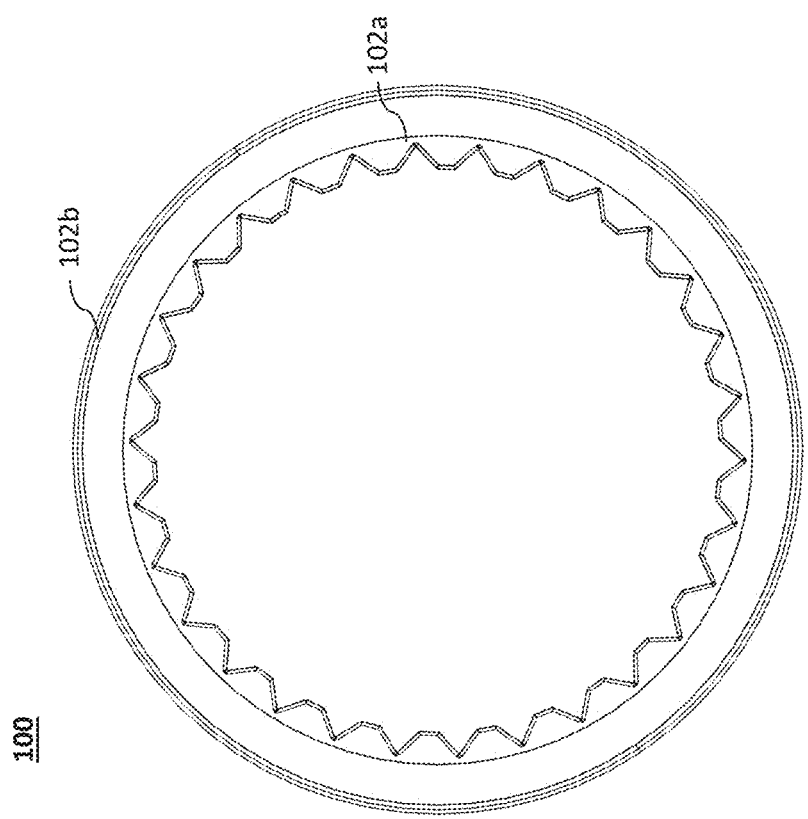
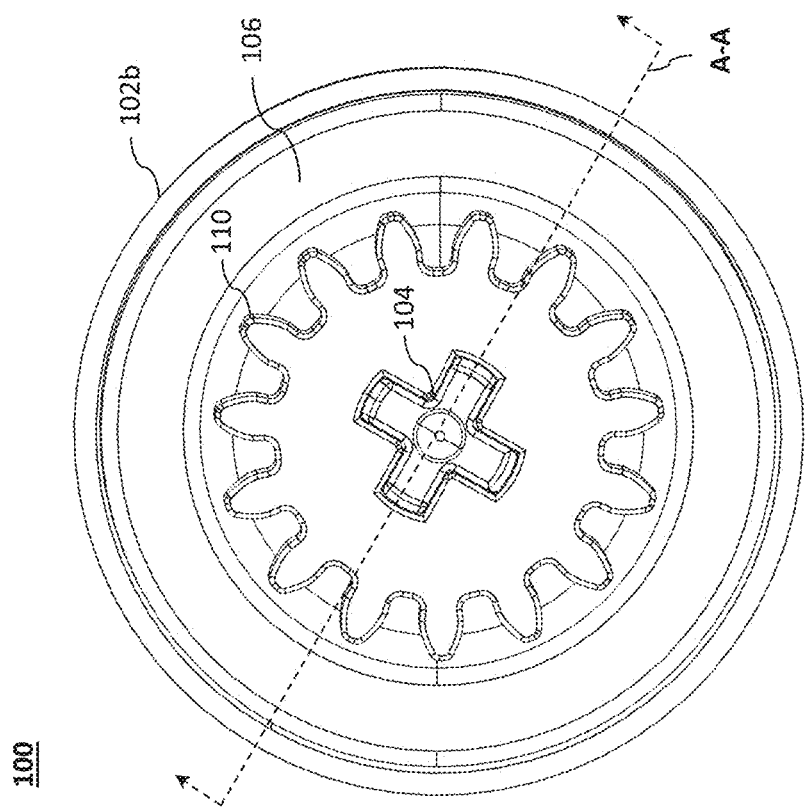
FIG. 1g
FIG. 1h

LOW PROFILE ROTARY DAMPER

RELATED APPLICATION

The present application claims priority to U.S. Provisional Patent Application No. 63/468,160, filed May 22, 2023, and entitled "Low Profile Rotary Damper," which is hereby incorporated by reference in its entirety.

BACKGROUND

Movement dampers of various types are used in assemblies and applications to control the movement of assembly components. For example, movement dampers can be used to control movement in at least one direction of a drawer or door in furniture, cabinets and appliances. In the automotive field, movement damper can be used on, for example, glove box and counsel doors as well as other doors and closures for bins, storage areas, and the like.

Example movement dampers include rotary dampers. A rotary damper generally comprises a housing and a rotor rotatable in the housing, with a shaft of the rotor extending outwardly from the housing to receive a gear thereon to, in turn, engage a gear on the device being controlled. In some rotary dampers of this type, a viscous fluid is provided in the housing, which is then sealed. Damping performance is facilitated by resistance of the fluid to rotation of the rotor within the sealed housing.

While effective, existing rotary damper designs result in a large profile (e.g., height) and, therefore, are not suitable for applications that impose physical size constraints on the rotary damper. Therefore, despite advancements to date, it would be highly desirable to have a low profile rotary damper that can be used in applications where space is limited.

SUMMARY

The present disclosure relates generally to a movement dampers and, more particularly to rotary dampers substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

Figure 1A:
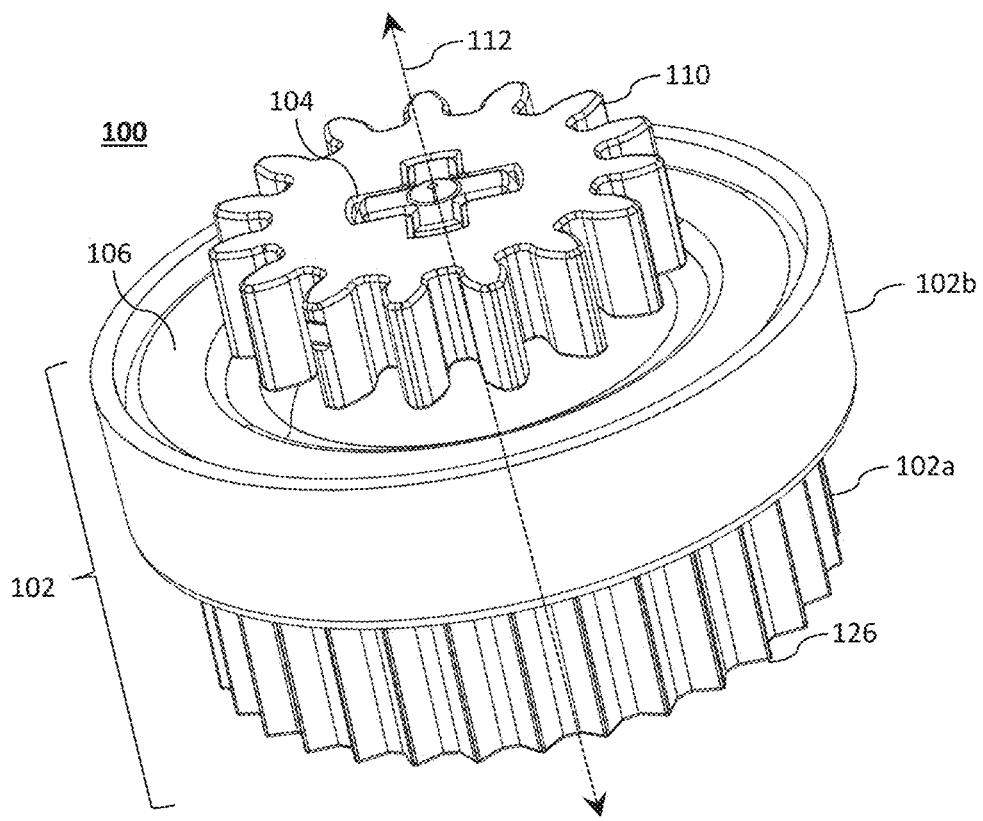
Figure 1B:
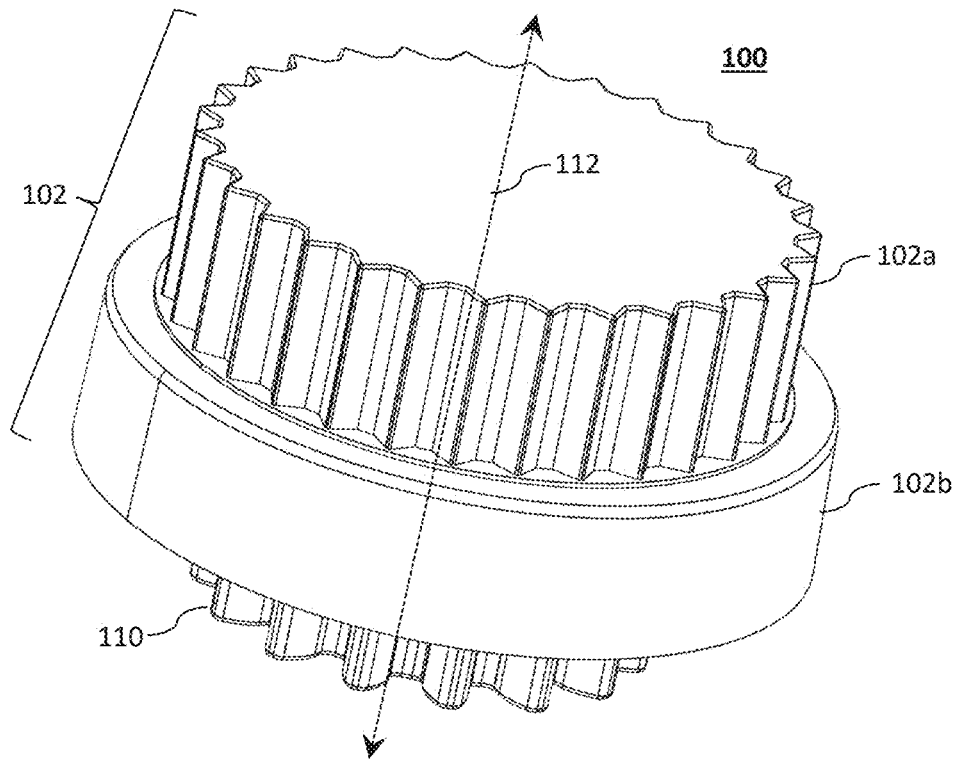
Figure 1C:
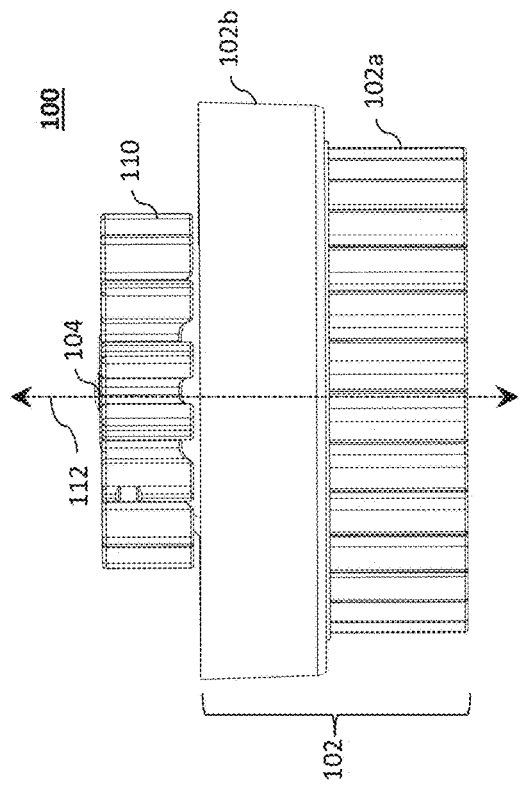
Figure 1E:
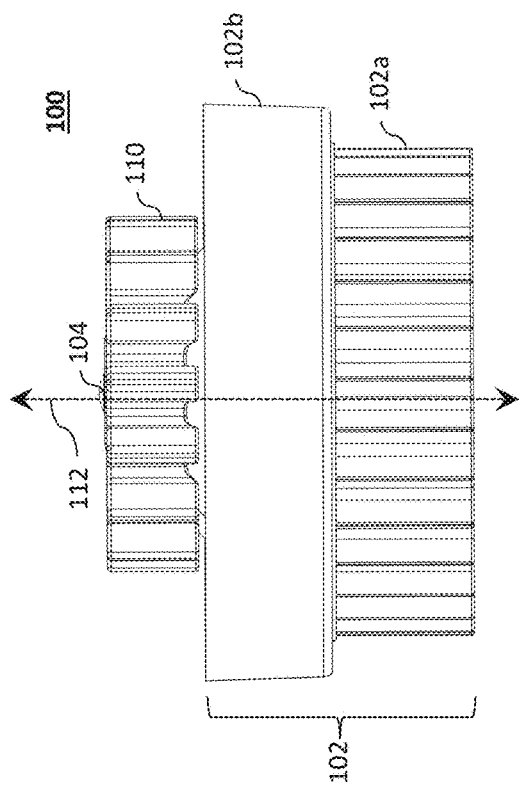
Figure 1D:
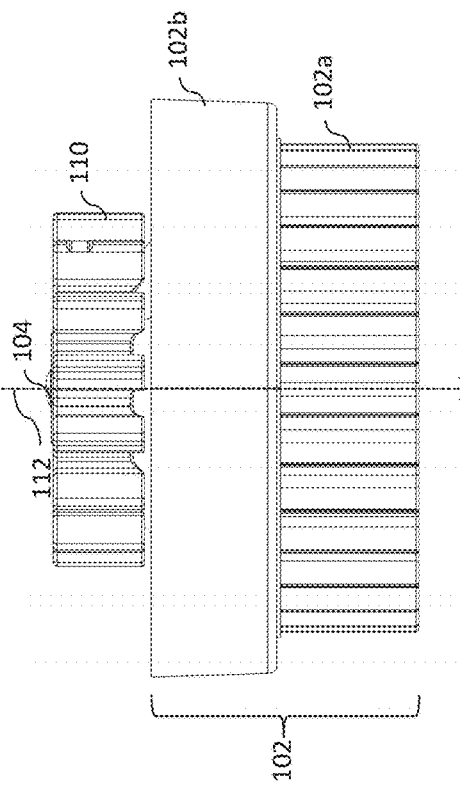
Figure 1F:
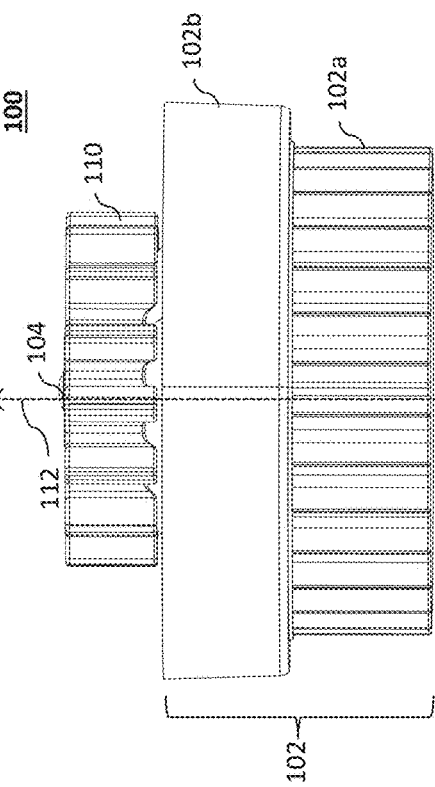

FIG. 1*a* illustrates a topside isometric view of the rotary damper assembly in accordance with an aspect of this disclosure, while FIG. 1*b* illustrates an underside isometric view thereof.

FIGS. 1*c* through 1*f* illustrate, respectively, first, second, third, and fourth elevation side views of the rotary damper assembly.

FIG. 1*g* illustrates a top plan view of the rotary damper assembly, while FIG. 1*h* illustrates a bottom plan view thereof.

Figure 1I:
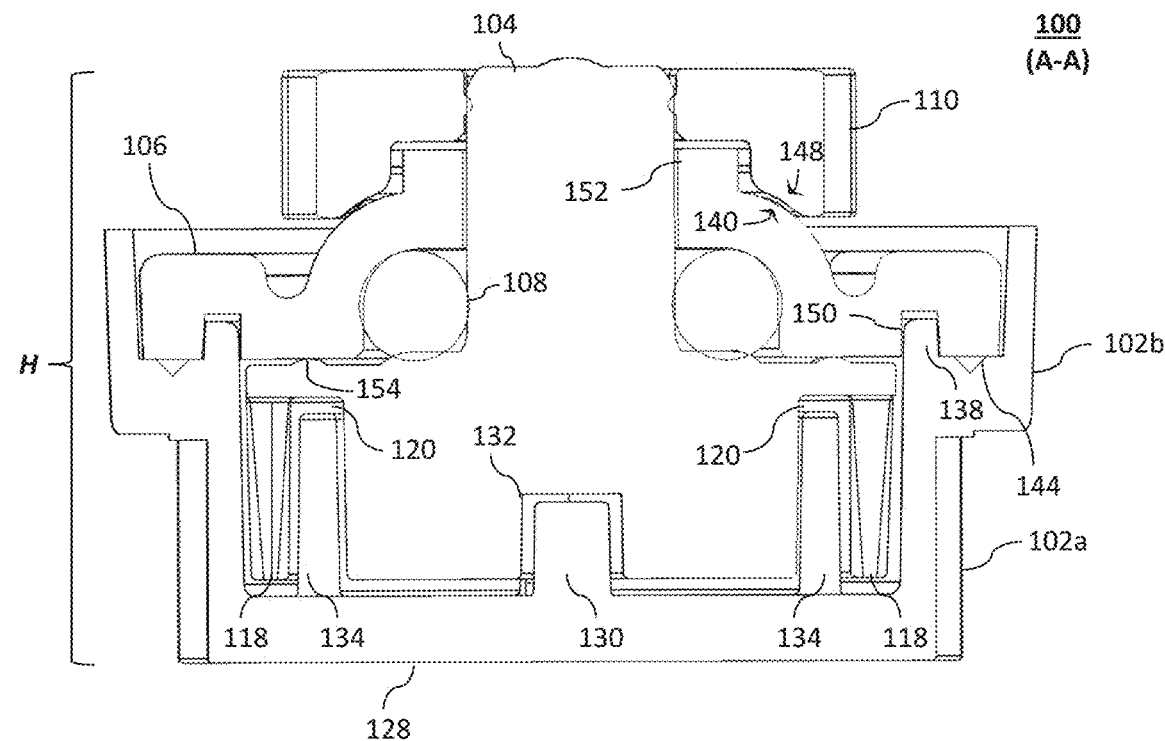

FIG. 1*i* illustrates a cross-sectional elevation side view of the rotary damper assembly taken along cutline A-A.

Figure 1J:
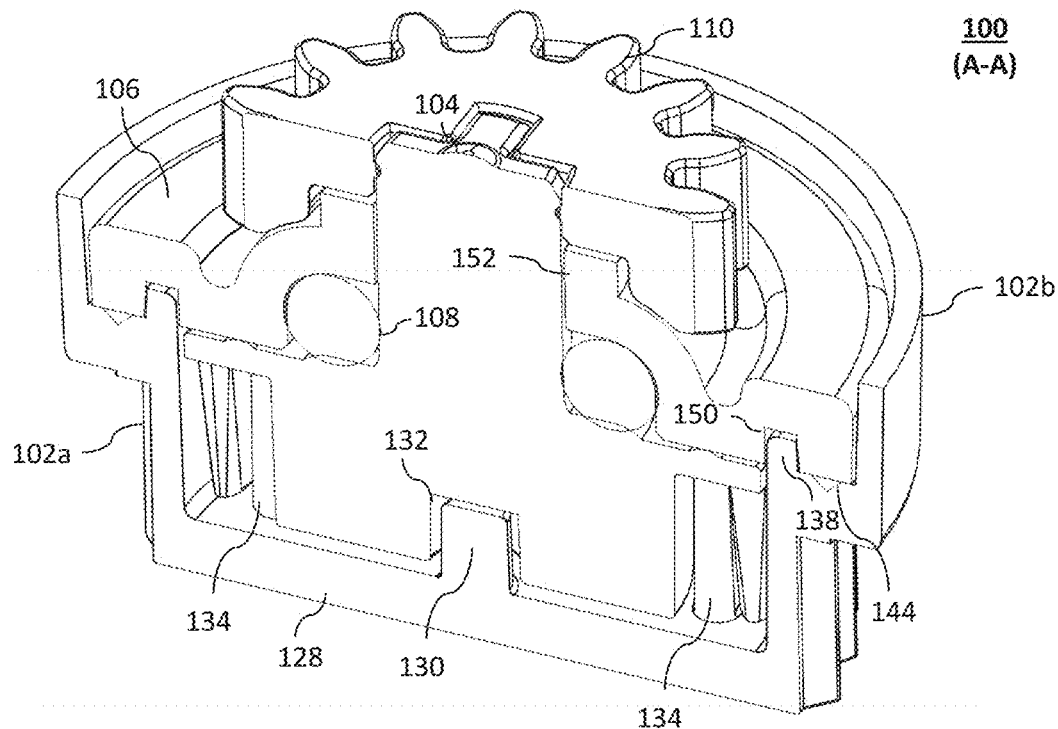

FIG. 1*j* illustrates a cross-sectional isometric view of the rotary damper assembly taken along cutline A-A.

Figure 1L:
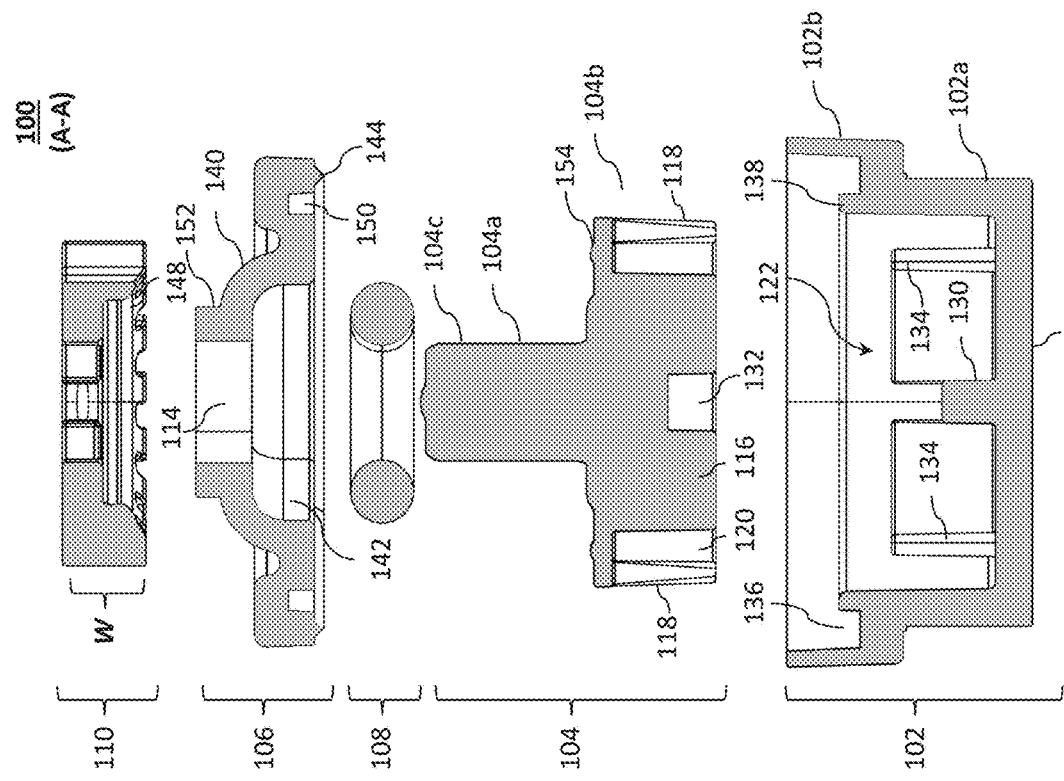
Figure 1K:
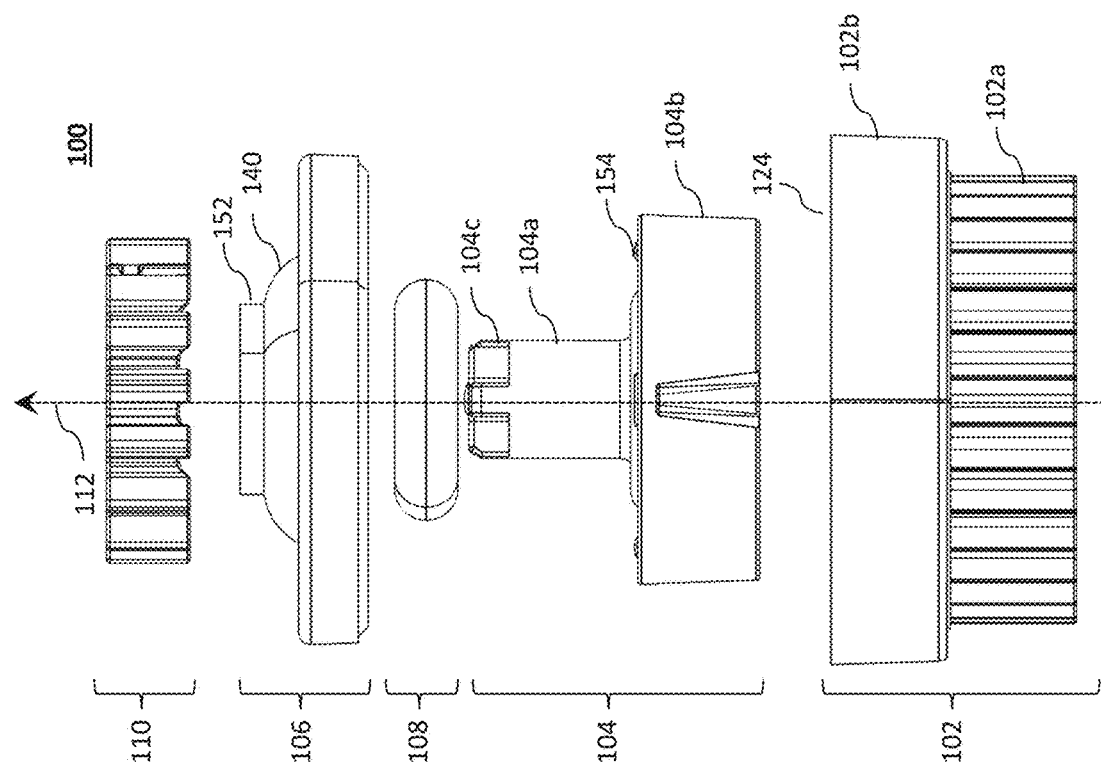

FIG. 1*k* illustrates an elevation side assembly view of the rotary damper assembly, while FIG. 1*l* illustrates a cross-sectional view thereof taken along cutline A-A.

Figure 1N:
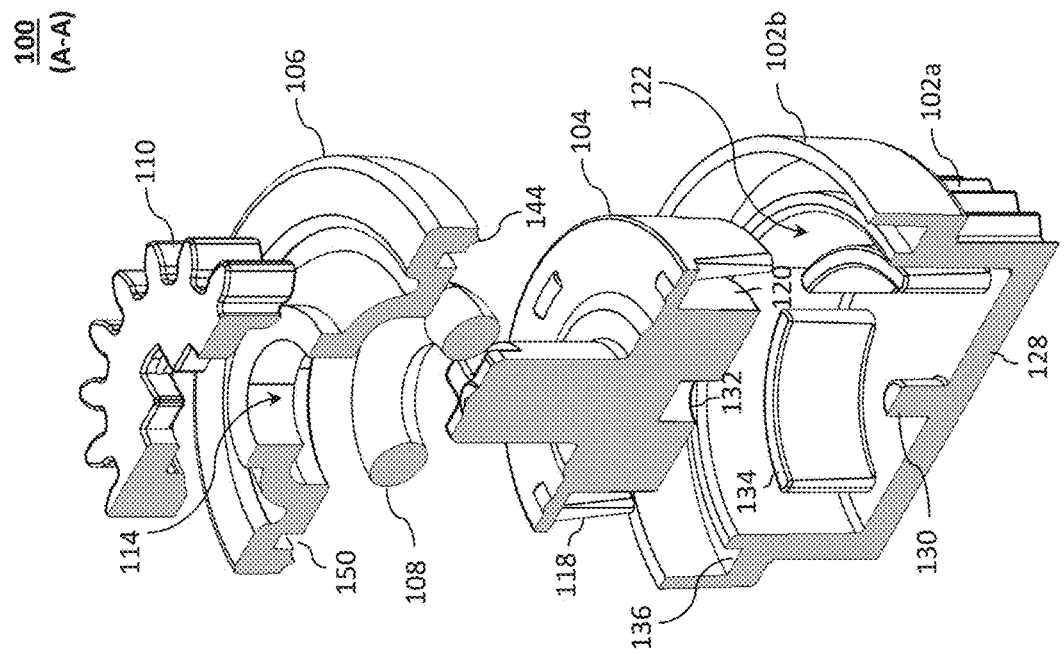
Figure 1M:
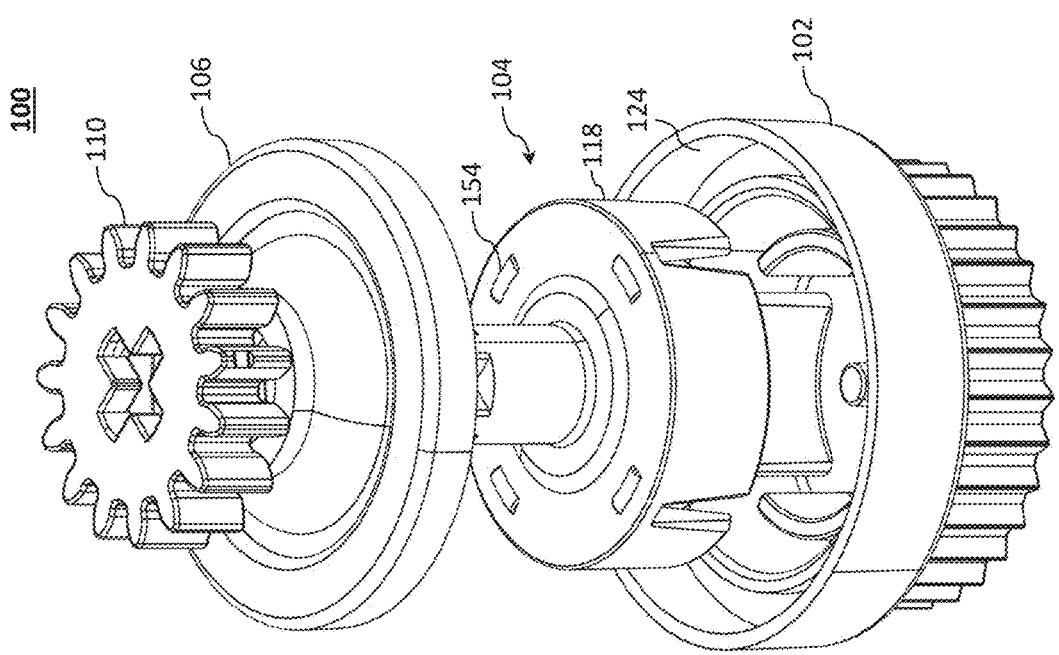

FIG. 1*m* illustrates an isometric assembly view of the rotary damper assembly, while FIG. 1*n* illustrates a cross-sectional view thereof taken along cutline A-A.

Figure 2B:
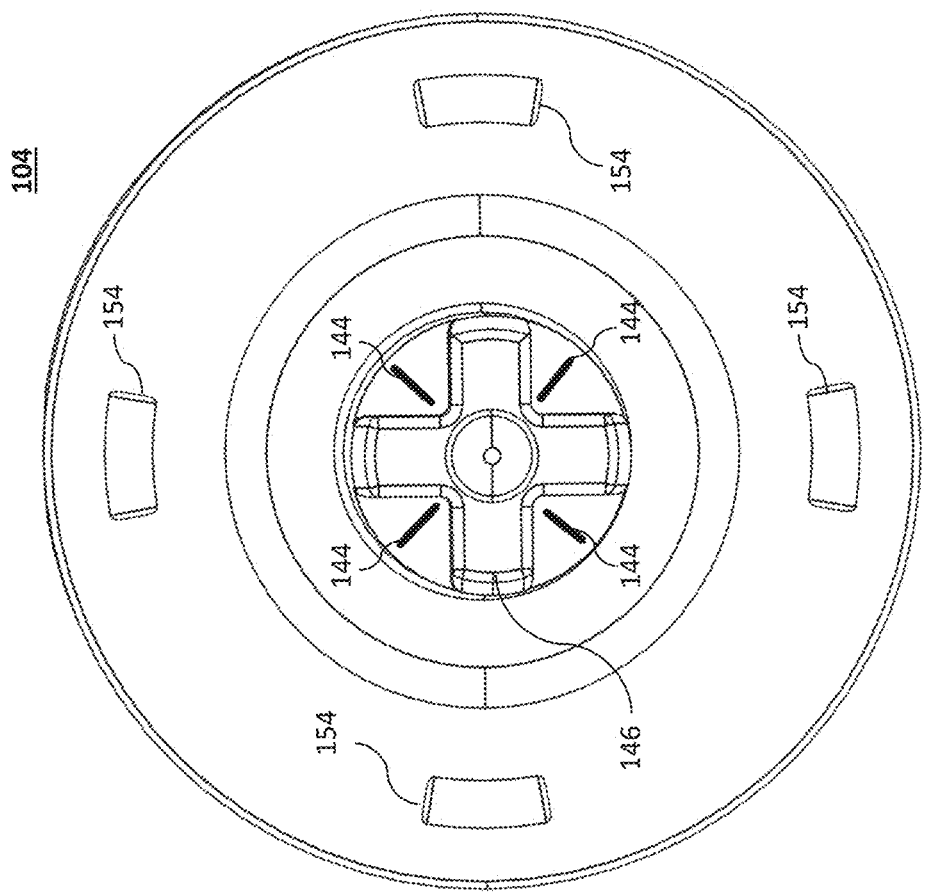
Figure 2A:
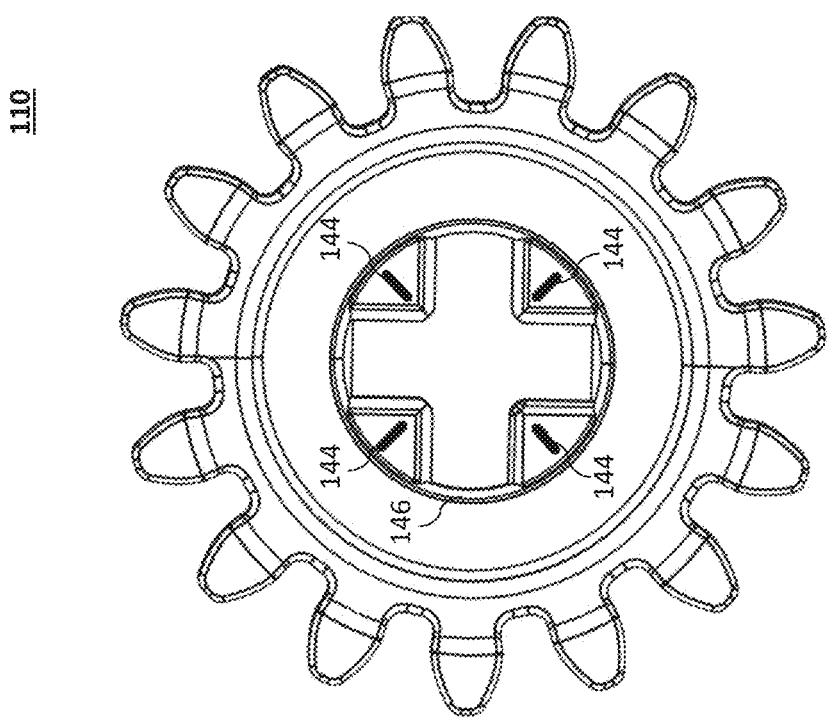

FIG. 2*a* illustrates a bottom plan view of the gear of FIG. 1*a*.

FIG. 2*b* illustrates a top plan view of the rotor of FIG. 1*a*.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Disclosed is a low profile rotary damper assembly. In one example, a rotary damper assembly comprises a rotor, an annular seal, a housing, a bearing plate, and a gear. The rotor includes a shaft portion integrally formed with a body portion. The shaft portion defines an engagement interface at a distal end thereof. The annular seal is configured to surround at least a portion of the shaft portion. The housing defines an opening and a rotor cavity, wherein the housing is configured to rotatably support the rotor. The bearing plate is coupled to the housing and is configured to seal the opening. The bearing plate includes an annular shoulder defining an aperture and a convex cap defining a seal cavity for the annular seal between the body portion and an interior surface of the convex cap. The shaft portion extends axially outwardly through the aperture. The gear is coupled to the rotor via an opening that is configured to receive the engagement interface. The gear is shaped with a generally concave cavity that is sized and shaped to receive the collar and at least a portion of the convex cap.

In some examples, each of the housing, the bearing plate, the rotor, and the gear are fabricated from a glass-reinforced polybutylene terephthalate (PBT).

In some examples, the housing comprises a first cylindrical portion includes a first diameter and a second cylindrical portion includes a second diameter that is greater than the first diameter, wherein the first cylindrical portion houses the body portion of the rotor.

In some examples, an outer surface of the first cylindrical portion comprises a plurality of teeth configured to engage a second gear.

In some examples, the annular seal is compressed between and in contact with the annular shoulder and the body portion.

In some examples, the rotary damper assembly further comprises a viscous material disposed within the rotor cavity. The viscous material can comprise a silicone oil or a silicone gel.

In some examples, the housing includes a pivot shaft extending into the rotor cavity from a base of the first cylindrical portion. The pivot shaft can be configured to engage a cylindrical recess formed in the center cylindrical body such that the body portion can rotate about the pivot shaft.

In some examples, the gear is fixedly mounted to the shaft portion at the engagement interface via a snap-in connection or an ultrasonic welding process. In some examples, at least one of the gear or the shaft portion comprises an energy director.

In some examples, the bearing plate is fixedly mounted to the housing via a snap-in connection or an ultrasonic welding process. The snap-in connection can comprise an annular recess and an annular rib for reception within the annular recess. The housing and/or bearing plate can comprise an annular energy director.

In some examples, the engagement interface comprises a non-circular cross-section sized and shaped to correspond to a shape of the opening in the gear. The non-circular cross-section can have an x-shaped cross-section.

In some examples, each of the housing, the bearing plate, the rotor, and the gear are fabricated from a glass-reinforced polybutylene terephthalate (PBT).

FIG. 1*a* illustrates a topside isometric view of an example rotary damper assembly 100 in accordance with an aspect of this disclosure, while FIG. 1*b* illustrates an underside isometric view of the rotary damper assembly 100 of FIG. 1*a*. FIGS. 1*c* through 1*f* illustrate, respectively, first, second, third, and fourth elevation side views of the rotary damper assembly 100 of FIG. 1*a*. FIG. 1*g* illustrates a top plan view of the rotary damper assembly 100 of FIG. 1*a*, while FIG. 1*h* illustrates a bottom plan view thereof. FIG. 1*i* illustrates a cross-sectional elevation side view of the rotary damper assembly 100 taken along cutline A-A. FIG. 1*j* illustrates a cross-sectional isometric view of the rotary damper assembly 100 taken along cutline A-A. FIG. 1*k* illustrates an elevation side assembly view of the rotary damper assembly 100 of FIG. 1*a*, while FIG. 1*l* illustrates a cross-sectional view thereof taken along cutline A-A. FIG. 1*m* illustrates an isometric assembly view of the rotary damper assembly 100 of FIG. 1*a*, while FIG. 1*n* illustrates a cross-sectional view thereof taken along cutline A-A.

As illustrated, the rotary damper assembly 100 generally comprises a housing 102, a rotor 104, a bearing plate 106, an annular seal 108 (e.g., an O-ring, a toric joint, gasket, etc.), and a gear 110. One or more components of the rotary damper assembly 100 (e.g., the gear 110, the bearing plate 106, the rotor 104, and/or the housing 102) can be fabricated from a plastic material using a plastic injection technique, additive manufacturing, or otherwise. For example, the rotary damper assembly 100, or one or more components thereof, can be fabricated from glass-reinforced polybutylene terephthalate (PBT). In some examples, the glass-reinforced PBT is a 30% glass-reinforced PBT material, such as Celanex 3300-2. In some examples, one or more components of the rotary damper assembly 100 may be fabricated using material extrusion (e.g., fused deposition modeling (FDM), stereolithography (SLA), selective laser sintering (SLS), material jetting, binder jetting, powder bed fusion, directed energy deposition, VAT photopolymerisation, and/or any other suitable type of additive manufacturing/3D printing process.

In operation, the rotary damper assembly 100 is configured to decelerate an objective movement of the gear 110 about an axis of rotation 112 relative to the housing 102, which may be fixed or, as illustrated, geared. In the illustrated example, the rotor 104 includes a shaft portion 104*a* and a body portion 104*b*. In some examples, the shaft portion 104*a* is integrally formed with the body portion 104*b*. The body portion 104*b* is configured to rotate within a viscous material housed within in the housing 102, while the shaft portion 104*a* extends outwardly from the housing 102, through an aperture 114 in the bearing plate 106 (and through the annular seal 108), to engage the gear 110 that is external to the housing 102. The annular seal 108 is configured to surround at least a portion of the shaft portion 104*a*. As illustrated, the annular seal 108 can be configured to surround a portion of the shaft portion 104*a* at its proximal end (e.g., adjacent the body portion 104*b*).

In the illustrated example, the body portion 104*b* comprises a center cylindrical body 116 surrounded by a plurality of outer walls 118 spaced from the center cylindrical body 116 to define an annular recess 120. When the body portion 104*b* rotates around the axis of rotation 112, the viscous material inside the damper produces fluid resistance, which results in the damping torque. The damping torque can be affected by a number of factors. First, the damping torque generated is a function of the size of the surface area of the rotor and housing disposed in contact with the viscous fluid. That is, the damping torque increases when the dimensions of the body portion 104*b* is increased. Second, the viscosity of the type of viscous material is a variable for determining the amount of damper torque; however, the damper torque can also change as a function of the temperature and the rotation speed of the rotor 104. For example, at higher temperatures, the torque decreases as the viscosity of the viscous material decreases at higher temperatures. Therefore, the viscous material can be any suitable viscous flowable fluid that may be desired for a particular application (e.g., based on operating temperature, and speed). In some examples, the viscous material is a silicone oil or a silicone gel. In some examples, the top surface of the rotor 104 includes one or more protrusions 154 (e.g., spacer bumps) to reduce wear between the rotor 104 and the bearing plate 106.

As best illustrated in the cross sectional views of FIGS. 1*i*, 1*j*, 1*l*, and 1*n*, the components of the rotary damper assembly 100 are configured to interconnect, while providing a low profile and without sacrificing the width of the gear teeth or reducing torque tolerance. In the illustrated example, the height (H) of the rotary damper assembly 100 is less than 20 mm, or about 14 mm.

The illustrated rotary damper assembly 100 comprises a rotationally-symmetrical housing 102 defining a rotor cavity 122 in which a rotationally-symmetrical rotor 104 is mounted. As illustrated, the housing 102 defines an opening 124 and the rotor cavity 122, where the rotor cavity 122 is configured to rotatably support the rotor 104. The housing 102 includes a first cylindrical portion 102*a* having a first diameter and a second cylindrical portion 102*b* having a second diameter that is greater than the first diameter. The first cylindrical portion 102*a* houses the body portion 104*b* of the rotor 104. The viscous material is disposed (and ultimately sealed) within the rotor cavity 122.

As illustrated, an outer surface (e.g., outer sidewall) of the first cylindrical portion 102*a* comprises a plurality of teeth 126 configured to engage another gear (e.g., a second gear); however, other configurations are contemplated. For example, instead of a plurality of teeth, the second cylindrical portion 102*b* can define a base with one or more flanges, tabs, and/or bolt-holes, which can be used to fixedly attach the housing 102 to a surface of a component.

The housing 102 includes a pivot shaft 130 extending into the rotor cavity 122 of the housing 102 from the center of a base 128 of the first cylindrical portion 102*a*. The pivot shaft 130 is configured to engage a cylindrical recess 132 formed in the center cylindrical body 116 such that the body portion 104*b* can rotate about the pivot shaft 130 and about the axis of rotation 112. Thus, the pivot shaft 130 can be concentric or otherwise align with the axis of rotation 112. In the illustrated example, the pivot shaft 130 is configured to insert into a cylindrical recess 132 formed in the center cylindrical body 116 such that the body portion 104*b* can rotate about the pivot shaft 130 and the axis of rotation 112.

The housing 102 further includes a plurality of curved walls 134 extending from the base 128 of the housing 102 towards the rotor cavity 122 of the housing 102. The plurality of curved walls 134 is configured to rotate within the annular recess 120 formed in the body portion 104*b* between a center cylindrical body 116 and outer walls 118. The plurality of curved walls 134 and the plurality of outer walls 118 serve to increase the surface area of the rotor 104 and housing 102 that is in contact with the viscous fluid. In the illustrated example, four outer walls 118 and four curved walls 134 are illustrated, however additional or fewer outer walls 118 and/or curved walls 134 may be used depending on the desired damper torque.

The bearing plate 106 is configured to couple to the housing 102 and configured to seal the opening 124. For example, the second cylindrical portion 102*b* can define an annular shoulder 136 with an inner annular lip 138 to engage an annular channel 150 of the bearing plate 106. The bearing plate 106 comprises an annular recess configured to receive the inner annular lip 138 when supported by the annular shoulder 136.

The bearing plate 106 includes a collar 152 defining the aperture 114 and a convex cap 140 defining a seal cavity 142 for the annular seal 108. The annular seal 108 is positioned between the body portion 104*b* and an interior surface of the convex cap 140. When assembled, the annular seal 108 is compressed between and in contact with the collar 152 and the body portion 104*b*. As illustrated, the shaft portion 104*a* extends axially outwardly through the aperture 114.

The rotor 104 and housing 102 as well as the bearing plate 106 can be made of plastic material so that the components can be snapped (e.g., via a snap-in connection) or welded together (e.g., via ultrasonic welding). The snap-in connection can comprise an annular recess and an annular rib for reception within the annular recess. The annular recess can be on the housing 102 and the annular rib can be on the bearing plate 106 (or vice versa).

In the illustrated example, however, the bearing plate 106 is fixedly mounted to the housing 102 via an ultrasonic welding process. To that end, an annular energy director 144 is formed on the shoulder-contacting surface of the bearing plate 106. In another example, one or both of the housing 102 and the bearing plate 106 comprise an annular energy director 144. The annular energy director 144 is used to facilitate the ultrasonic welding process by focusing and directing the ultrasonic energy to the desired welding location. As illustrated, the energy director is a small, raised feature and can be located on one or both of the bearing plate 106 and the housing 102.

The convex cap 140 of the bearing plate 106 is curved to define a seal cavity 142 for the annular seal 108 with a collar 152 at the center. The gear 110 is coupled to the rotor 104 via an opening 146 configured to receive the engagement interface 104*c*. As illustrated, the gear 110 is shaped with a generally concave cavity 148 that is sized and shaped to receive the collar 152 and at least a portion of the convex cap 140. By recessing at least a portion of the bearing plate 106, the gear width (W) can be preserved, thus maintaining gear tooth strength. Further, as illustrated, a low profile is achieved, in part, because gear 110 is supported on underside of the gear 110 by convex profile of the convex cap 140. Any deflection due to high torque and/or over gear mesh would be minimal by supporting the gear 110 with the convex cap 140. As a result, the high torque has a minimal impact on the performance of the rotary damper assembly 100.

The illustrated rotor 104 has a shaft portion 104*a* extending outwardly from the housing 102 and through the bearing plate 106. In some examples, the shaft portion 104*a* defines an engagement interface 104*c* at a distal end thereof. As illustrated, the distal end of the shaft portion 104*a* is shaped to define an engagement interface 104*c* configured to engage a corresponding opening 146 in the gear 110. The gear 110 is fixedly mounted to the shaft portion 104*a* at the engagement interface 104*c*. In some examples, the gear 110 is fixedly mounted to the shaft portion 104*a* via an ultrasonic welding process and/or a snap-in connection.

To provide an secure connection while also providing a small rotary damper assembly 100 (or to increase the connection strength, where desired), the engagement interface 104*c* can use a non-circular cross-section and/or one of more engagement features (e.g., a complex profile and/or complex features, such as lobes) to increase the contact area between the gear 110 and the shaft portion 104*a* at the engagement interface 104*c*. A non-circular cross-section and/or one of more engagement features offers a number of advantages. First, a non-circular cross-section can increase the contact surface area between the between the gear 110 and the shaft portion 104*a*, thus increasing the adhesive retention at the engagement interface 104*c*. Second, a non-circular cross-section can be shaped to include engagement features, thus providing a higher degree of mechanical retention. For example, the gear 110 and/or the shaft portion 104*a* may be shaped to form an engagement interface 104*c* having one or more interlocking features to increase mechanical retention. Example interlocking features define a non-circular cross-section that is, as illustrated, a plus-shaped/x-shaped cross-section, but in other examples, it may comprise a non-circular cross-section with lobes, dovetails, etc. The corresponding opening 146 in the gear 110 is preferably shaped to correspond to the shape of the non-circular cross-section of the engagement interface 104c. To that end, the engagement interface 104c can comprise a non-circular cross-section sized and shaped to correspond to a shape of the opening 146 in the gear 110.

Once assembled, the gear 110 and the shaft portion 104a can be joined via an ultrasonic welding process. To that end, as best illustrated in FIGS. 2a and 2b, one or both of the gear 110 and the shaft portion 104a may have one or more energy directors 144 formed thereon (e.g., at the contact surfaces between the gear 110 and the shaft portion 104a). While a gear 110 is illustrated, other components and/or mechanical linkages are contemplated for otherwise connecting the rotary damper assembly 100 to or within a system having a component for which dampening control is to be provided.

During assembly, the housing 102 is filled with a suitable viscous fluid, thereafter, the rotor 104 is inserted. Once the rotor 104 is inserted in the rotor cavity 122, the annular seal 108 is coupled to the shaft portion 104a. For example, the annular seal 108 can be slipped over and down the shaft portion 104a. The bearing plate 106 is coupled (e.g., via ultrasonic welding, snap-in connections, adhesives, or otherwise) to the housing 102 at the second cylindrical portion 102b to seal the viscous fluid within the rotor cavity 122. The gear 110 is then coupled (e.g., via ultrasonic welding, snap-in connections, adhesives, or otherwise) to the shaft portion 104a at its distal end (e.g., via the engagement interface 104c).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A rotary damper assembly, comprising:
   a rotor having a shaft portion integrally formed with a body portion, wherein the shaft portion defines an engagement interface at a distal end thereof;
   an annular seal configured to surround at least a portion of the shaft portion;
   a housing defining an opening and a rotor cavity, wherein the housing is configured to rotatably support the rotor;
   a bearing plate coupled to the housing and configured to seal the opening,
      wherein the bearing plate includes a collar defining an aperture and a convex cap defining a seal cavity for the annular seal between the body portion and an interior surface of the convex cap, and
      wherein the shaft portion extends axially outwardly through the aperture; and
   a gear coupled to the rotor via an opening configured to receive the engagement interface, wherein the gear is shaped with a generally concave cavity that is configured to receive at least a portion of the convex cap and a cylindrical recess configured to receive the collar at least a portion of the convex cap.

2. The rotary damper assembly according to claim 1, wherein the housing comprises a first cylindrical portion having a first diameter and a second cylindrical portion having a second diameter that is greater than the first diameter, wherein the first cylindrical portion houses the body portion of the rotor.

3. A rotary damper assembly, comprising:
   a rotor having a shaft portion integrally formed with a body portion, wherein the shaft portion defines an engagement interface at a distal end thereof;
   an annular seal configured to surround at least a portion of the shaft portion;
   a housing defining an opening and a rotor cavity, wherein the housing is configured to rotatably support the rotor, and comprises a plurality of teeth on an outer surface thereof configured to engage a second gear;
   a bearing plate coupled to the housing and configured to seal the opening,
      wherein the bearing plate includes a collar defining an aperture and a convex cap defining a seal cavity for the annular seal between the body portion and an interior surface of the convex cap, and
      wherein the shaft portion extends axially outwardly through the aperture; and
   a gear coupled to the rotor via an opening configured to receive the engagement interface, wherein the gear is shaped with a generally concave cavity that is sized and shaped to receive the collar and at least a portion of the convex cap.

4. The rotary damper assembly according to claim 1, wherein the annular seal is compressed between and in contact with an annular shoulder and the body portion.

5. The rotary damper assembly according to claim 1, further comprising a viscous material disposed within the rotor cavity.

6. The rotary damper assembly according to claim 5, wherein the viscous material comprises a silicone oil or a silicone gel.

7. The rotary damper assembly according to claim 2, wherein the housing includes a pivot shaft extending into the rotor cavity from a base of the first cylindrical portion.

8. The rotary damper assembly according to claim 7, wherein the pivot shaft is configured to engage a cylindrical recess formed in the body portion such that the body portion can rotate about the pivot shaft.

9. The rotary damper assembly according to claim 1, wherein the gear is fixedly mounted to the shaft portion at the engagement interface via an ultrasonic welding process.

10. The rotary damper assembly according to claim 8, wherein at least one of the gear or the shaft portion comprises an energy director.

11. The rotary damper assembly according to claim 1, wherein the gear is fixedly mounted to the shaft portion at the engagement interface via a snap-in connection.

12. The rotary damper assembly according to claim 1, wherein the bearing plate is fixedly mounted to the housing via an ultrasonic welding process.

13. The rotary damper assembly according to claim 12, wherein the bearing plate comprises an annular energy director.

14. The rotary damper assembly according to claim 12, wherein the housing comprises an annular energy director.

15. The rotary damper assembly according to claim 1, wherein the bearing plate is fixedly mounted to the housing via a snap-in connection.

16. The rotary damper assembly according to claim 15, wherein the snap-in connection comprises an annular recess and an annular rib for reception within the annular recess.

17. The rotary damper assembly according to claim 1, wherein the engagement interface comprises a non-circular cross-section sized and shaped to correspond to a shape of the opening in the gear.

18. The rotary damper assembly according to claim 17, wherein the non-circular cross-section has an x-shaped cross-section.

19. The rotary damper assembly according to claim 1, wherein each of the housing, the bearing plate, the rotor, and the gear are fabricated from a glass-reinforced polybutylene terephthalate (PBT).

20. A rotary damper assembly, comprising:
a rotor having a shaft portion integrally formed with a body portion, wherein the shaft portion defines an engagement interface at a distal end thereof;
an annular seal configured to surround at least a portion of the shaft portion;
a housing configured to rotatably support the rotor, wherein the housing defines an opening, a rotor cavity, and a plurality of teeth formed on an exterior surface;
a bearing plate coupled to the housing and configured to seal the opening,
wherein the bearing plate includes a collar and a convex cap defining a seal cavity for the annular seal between the body portion and an interior surface of the convex cap, and
wherein the shaft portion extends axially outwardly through an aperture in the bearing plate; and
a gear coupled to the rotor via an opening configured to receive the engagement interface, wherein the gear is shaped with a generally concave cavity that is sized and shaped to receive the collar and at least a portion of the convex cap.

* * * * *